United States Patent
Breman et al.

(10) Patent No.: US 6,413,429 B1
(45) Date of Patent: Jul. 2, 2002

(54) PROCESS AND APPARATUS FOR LIQUID-LIQUID EXTRACTION

(75) Inventors: Berthold Berend Breman, Zutphen; Jan Visser, Arnhem, both of (NL)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/754,159

(22) Filed: Jan. 4, 2001

Related U.S. Application Data
(60) Provisional application No. 60/183,517, filed on Feb. 18, 2000.

(30) Foreign Application Priority Data

Jan. 7, 2000 (NL) .............................................. 1014034

(51) Int. Cl.⁷ .............................................. B02D 11/00
(52) U.S. Cl. ........................ 210/634; 210/511; 210/513; 210/799; 210/800; 210/804; 210/DIG. 5
(58) Field of Search ................................ 210/511, 513, 210/634, 638, 639, 799, 800, 804, 806, DIG. 5; 422/255, 256, 258, 259

(56) References Cited

U.S. PATENT DOCUMENTS

| | | | |
|---|---|---|---|
| 3,973,759 A | | 8/1976 | Mizrahi et al. |
| 4,888,117 A | * | 12/1989 | Brown et al. |
| 5,772,730 A | * | 6/1998 | Bannach Sichtermann et al. ......................... 210/634 |

FOREIGN PATENT DOCUMENTS

| | | |
|---|---|---|
| DE | 198 15 287 | 10/1999 |
| EP | 0 685 249 | 12/1995 |
| GB | 1 443 704 | 7/1976 |

* cited by examiner

Primary Examiner—Joseph W. Drodge
(74) Attorney, Agent, or Firm—Richard P. Fennelly

(57) ABSTRACT

Claimed are a process and an apparatus for extracting a component dissolved in a liquid by means of liquid-liquid extraction using an extraction liquid which is immiscible or only partially miscible with the liquid, in which process the extraction liquid is dispersed in the liquid in a dispersion apparatus and then coalesced in a coalescer, after which the ex traction liquid, the specific weight of which differs by at least 5% from the specific weight of the liquid to be extracted in which the component to be extracted is to be found, is separated from the liquid by gravity in a phase separator in which process in order to obtain an efficiency per extraction stage of at least 0.9 at an average residence time of at most 15 seconds in the dispersion apparatus and of at most 300 seconds in the phase separator, at a linear velocity in the coalescer related to its cross-section of at least 30 m/hour:

a. the dispersion apparatus used is a centrifugal pump which will give droplets having an average diameter of 5 to 500 μm, b. the coalescer used is a packed bed of 5–100 cm high composed of dimensionally stable particles wettable by the extraction liquid having an average particle size of 0.05 to 2 mmL and c. the coagulated phase in the phase separator is separated at a linear velocity related to the cross-section of the phase separator of 0.1 to 0.7 times the linear velocity in the coalescer.

21 Claims, 2 Drawing Sheets

PROCESS AND APPARATUS FOR LIQUID-LIQUID EXTRACTION

This application claims the benefit of Netherlands Patent Application Serial No. 1014034, filed Jan. 7, 2000 and of U.S. Provisional Application Serial No. 60/183,517, filed Feb. 18, 2000.

BACKGROUND OF THE INVENTION

The invention pertains to a process for extracting a component dissolved in a liquid by means of liquid-liquid extraction using an extraction liquid which is immiscible or only partially miscible with the liquid, in which process the extraction liquid is dispersed in the liquid in a dispersing apparatus and then coalesced in a coalescer, after which the extraction liquid, the specific weight of which differs by at least 5% from the specific weight of the liquid be extracted in which the component to be extracted is to be found, is separated from the liquid by gravity in a phase separator, as well as to an apparatus for implementing such as process.

The literature describes a large number of apparatuses for carrying out processes of the above-mentioned type. Particularly when high demands are made on the efficiency per extraction stage at a comparatively high throughput, generally use is made of columns or centrifuges. These as a rule require much greater investment than the well-known mixer-settlers. However, the latter have the drawback of a comparatively low throughput and hence are less suitable for use on a commercial schale.

A description of a mixer-settler is to be found in for example GB-A-1 443 704. The liquid to be extracted and the extraction liquid are continuously charged to a mixing chamber, where a dispersion is created by vigorous stirring. This is then passed through a perforate, coalescence promoting packing which encloses the chamber wholly or in part, on the opposite side of which packing a phase separator is provided.

One drawback to the known process consists in that the coalescence of very fine dispersions (<100 μm) through the indicated packings generally proceeds with great difficulty. Only when dispersions with a comparatively large droplet size are employed is it possible to achieve a high throughput. However, this is at the expense of the efficiency per extraction stage, the result of which is that a large number of these units have to be arranged in series, which calls for a high capital outlay.

It has also been found that the known process is subject to many restrictions, in particular because of the limited range of suitable extracting agents. Thus the viscosity of the extracting agent may be a restrictive factor when implementing the described dispersion method.

SUMMARY OF THE INVENTION

The invention now provides a process and an apparatus with the aid of which far higher efficiencies can be obtained with a comparatively small number of extraction units than is the case with the known apparatuses, while the selection of the type of extracting agent is subject to Far fewer restrictions.

The invention consists in that in a process of the known type mentioned in the opening paragraph to obtain an efficiency per extraction stage of at least 0.9 at an average residence time of at most 15 seconds in the dispersion apparatus and of at most 300 seconds in the phase separator, at a linear velocity in the coalescer related to its cross-section of at least 30 m/hour:

a. the dispersion apparatus used is a centrifugal pump which will give droplets having an average diameter of 5 to 500 μm,
b. the coalescer used is a packed bed of 5–100 cm high composed of dimensionally stable particles wettable by the extraction liquid having an average particle size of 0.05 to 2 mm, and
c. the coagulated phase in the phase separator is separated at a linear velocity related to the cross-section of the phase separator of 0.1 to 0.7 times the linear velocity in the coalescer.

In this case preference is given to a process where the average residence time in the dispersion apparatus is at most 10 seconds.

By efficiency per extraction stage is meant the ratio of the actual concentration of the substance to be extracted in the effluent, $x_{eff}$, to the concentration which can be realised in a state of complete equilibrium, $x_{eff}^*$. The efficiency per extraction stage ranges from 0 to 1. A stage efficiency of 1 signifies that in the extraction stage in question a state of complete equilibrium has been achieved.

The number of equilibrium stages N required to achieve a pre-set extraction efficiency can be calculated with the aid of the Kremser-Souders-Brown equation:

$$N = \frac{\ln\{(1 - 1/\Lambda)(x_{infl} - x_{eff}^*)/(x_{eff} - x_{eff}^*) + 1/\Lambda\}}{\ln \Lambda},$$

wherein $\Lambda$ represent the extraction factor, $x_{infl}$ is the concentration of the component to be extracted in the influent, and $x_{eff}$ and $x_{eff}^*$ are as indicated above.

The extraction factor $\Lambda = (m^* \Phi_d^* \rho_d)/\Phi_c^* \rho_c$, wherein m=the mass based distribution coefficient in $[kg_c/kg_d]$, $\Phi_{c,d}$=the flow rates of the continuous and the disperse phase, respectively, in $[m^3/hour]$, and $\rho_{c,d}$=the density of the continuous and the disperse phase, respectively, in $[kg/m^3]$.

To obtain an efficiency per extraction stage of at least 0.9, as a rule, to obtain a large specific surface area, preference is given to a dispersion in which the average droplet size of the disperse phase <<100 μm. According to the invention, preference is given in that case to the use of a modified or unmodified centrifugal pump in which at the fan tips rates of shear of 150,000 to 2,000 s$^{-1}$ can be realised, resulting in a Reynolds number (Re) of 25,000 to 500,000, corresponding to the formula:

Re=$\rho N D^2/\eta$, wherein N represents the rotational speed of the fans in numbers of revolutions per second, D stands for the diameter of the fans in m, $\rho$ stands for the density of the continuous phase in kg/m$^3$, and $\eta$ stands for the viscosity of the continuous phase in Pa.s, with the difference in surface tension between the disperse and the continuous phase ranging from 0.01 to 0.3 N/m and the viscosity ratio of the disperse phase ($\eta_d$) to the continuous phase ($\eta_c$) ranging from 0.1 to 10.

Examples of suitable centrifugal pump mixers have been disclosed, int. al., in Ullman, Vol. B3, Part 6, pp. 20 and 21. Preference is given in this case to a centrifugal pump mixer of the type described in U.S. Pat. No. 3,973,759. Various methods can be used for coalescing the dispersions obtained with these mixers. When they make mention of a packed column, it will generally be filled with, e.g., Raschig rings with a size ranging from 0.5" to 1.5", which corresponds to 12.7 to 38.1 mm. They make no mention whatsoever of the potential advantages of using a packed filter bed filled with extraction liquid-wettable particles having an average particle size of 0.05 to 2 mm. Such advantages are mentioned in EP-A-0 685 249, where a disperse liquid phase is separated from a gas or a liquid. However is document is not concerned with extraction, as is clear from the examples, which deal only with collecting very finely distributed droplets of liquid from an aerosol. Nor can any suggestion be derived from it to the effect that a liquid-liquid dispersion containing droplets of an average diameter ranging from 5 to 500 $\mu$m can be separated to a sufficient degree in such a column at a rate of 30 m/hour and that, in consequence, such a column would be pre-eminently suitable for use in a highly efficient liquid-liquid extraction process.

For that reason it has to be considered extremely surprising, especially in view of the very large dimensions of the packing material used up to now in commercially available mixer-settlers, that a much higher efficiency can be obtained at a much larger throughput than was customary up to now when the aforesaid packing material is employed.

It has been found that when the linear velocity in the coalescer is increased to more than 60 m/hour, favourable results cain still be obtained at a residence time in the phase separator of less than 150 and preferably not more than 60 seconds.

The height of the packed bed in the coalescer may range from 5 to 100 cm. However, a bed with a height selected in the range of 8 to 50 cm is preferred. The materials of which the particles in the packed bed may be made generally belong to the group van hydrophobic polymers such as low pressure polyethylene, high pressure polyethylene, polypropylene, polystyrene, polyvinylidene fluoride (PVDF), acrylonitrile-butadiene-styrene terpolymers, styrene-acrylonitrile copolymers, styrene-butadiene copolymers, poly(4-methyl-pentene-1), and polybutene. Preference is given in this case to polyolefins, more particularly to polypropylene.

The packing material to be used when employing the process according to the invention may be composed of solid polymer particles or of porous material.

Alternatively, one part may be composed of solid particles while the other part is made up of porous particles. In addition, the polymer may be filled with a filler such as a particulate powder and/or natural or synthetic fibres such as glass fibres and/or carbon fibres. The filler may comprise ceramic material, glass, carbon, metal and/or synthetic material. The fibrous material may comprise fibres of silicon carbide, silicon nitride, carbon, graphite and/or alumina, with the dimensions of the fibre diameter ranging from 0.5 to 13 $\mu$m. Preference is given to porous particles of a dimensionally stable polymer filled with a liquid which is also used in the preparation of the particles.

The preparation of the porous particles may proceed as follows: first, 5–90 wt. % of a polymer is dissolved, with heating, at a temperature above the upper critical phase separation temperature Tc in 10–95 wt. % of a hydrophobic liquid, resulting in a polymer-rich and a polymer-poor phase. Assuming that no filler has yet been incorporated into the polymer, filler may be added during the preparation if so desired in an amount such that it constitutes 60 per cent by volume of the overall solids content. On further lowering of the temperature at a cooling rate of about 0.5 to 3° C./min and preferably of about 1.5° C./min, this phase separation structure, due to vitrification or crystallisation of the polymer, is then fixed before the phase separation is completed, resulting in a porous polymer material the pores of which are filled with the liquid. After reduction to the desired particle size, the granulate or powder is ready in principle for use in a packed column. If so desired, the particles may be extracted and then filled with a different type of oil, e.g., oil of the same type as is used as extraction liquid.

When the extracted liquid on leaving the phase separator still contains too much extraction liquid, it is passed through a second packed bed of 5–100 cm high which is filled with particles more or less comparable in composition and size to those used in the first bed, after which the extraction liquid is separated by gravity in a second phase separator.

The invention further pertains to an apparatus for implementing the process according to the invention, which apparatus comprises the following members a. a modified or unmodified centrifugal pump for dispersing the extraction liquid and the liquid which is immiscible or only partially miscible with it in which the component to be extracted is to be found, which pump is equipped with an inlet and an outlet, in which pump the extraction liquid and the liquid are subjected to forces of shear, and an outlet of which pump is connected to an inlet of b. a coalescer comprising a packed bed of 5–100 cm high of dimensionally stable extraction liquid-wettable particles having an average particle size of 0.05 to 2 mm, of which the outlet opens into c. a phase separator where the extraction liquid and the liquid are separated by gravity and which is also equipped with an outlet for the extraction liquid and an outlet for the liquid.

Preferred is an apparatus with a packed bed of 5 to 50 cm high. So far, optimum results have been achieved using a centrifugal pump with an infinitely variable rotational speed which has two separate inlets for the liquid and the extraction liquid, respectively, with said inlets being positioned vis-à-vis one another such that the liquid and the extraction liquid are brought into contact in the centrifugal pump in an area where forces of shear prevail.

Under some conditions the liquid on leaving the phase separator may still contain too much extraction liquid. To prevent this state of affairs, the outlet of the phase separator for the liquid can be connected to the inlet of a second coalescer provided with a packed bed of 5–100 cm high filled with particles which are more or less comparable in composition and size to those used in the first coalescer, with the outlet of the second coalescer being connected to a second phase separator where the extraction liquid and the liquid are separated by gravity, with the second phase separator having an outlet for the extraction liquid as well as an outlet for the liquid.

When several apparatuses according to the invention are employed, preference is given to a set-up in which they are connected to one another in counterflow relation, with the liquid outlet of the phase separator of apparatus N being connected to the liquid inlet of the dispersion apparatus of apparatus N+1 and the extraction liquid inlet of the dispersion apparatus of apparatus N being connected to the extraction liquid outlet of the phase separator of apparatus N−1.

To prevent the liquid leaving the final phase separator from still containing small quantities of extraction liquid, the phase separator outlet for the liquid from the final apparatus can be connected to the inlet of a final coalescer provided with a packed bed of 5–100 cm high filled with particles which are more or less comparable in composition and size to those used in the other coalescers, with the outlet of said final coalescer being connected to a final phase separator in which the extraction liquid and the liquid are separated by gravity and where the final phase separator has an outlet for the extraction liquid as well as an outlet for the liquid.

The invention will be elucidated further with reference to the following examples, in which it is shown, int. al., that the process according to the invention makes it possible to extract a component from a liquid using an extraction liquid which is immiscible or only partially miscible with the liquid, in which process the extraction liquid is dispersed in the liquid and then coalesced in a coalescer. Also included are several figures for further illustration of the invention. Needless to say, the examples are for illustrative purposes only and do not restrict the scope of the invention in any way.

DETAILED DESCRIPTION OF THE INVENTION

Figure 1:
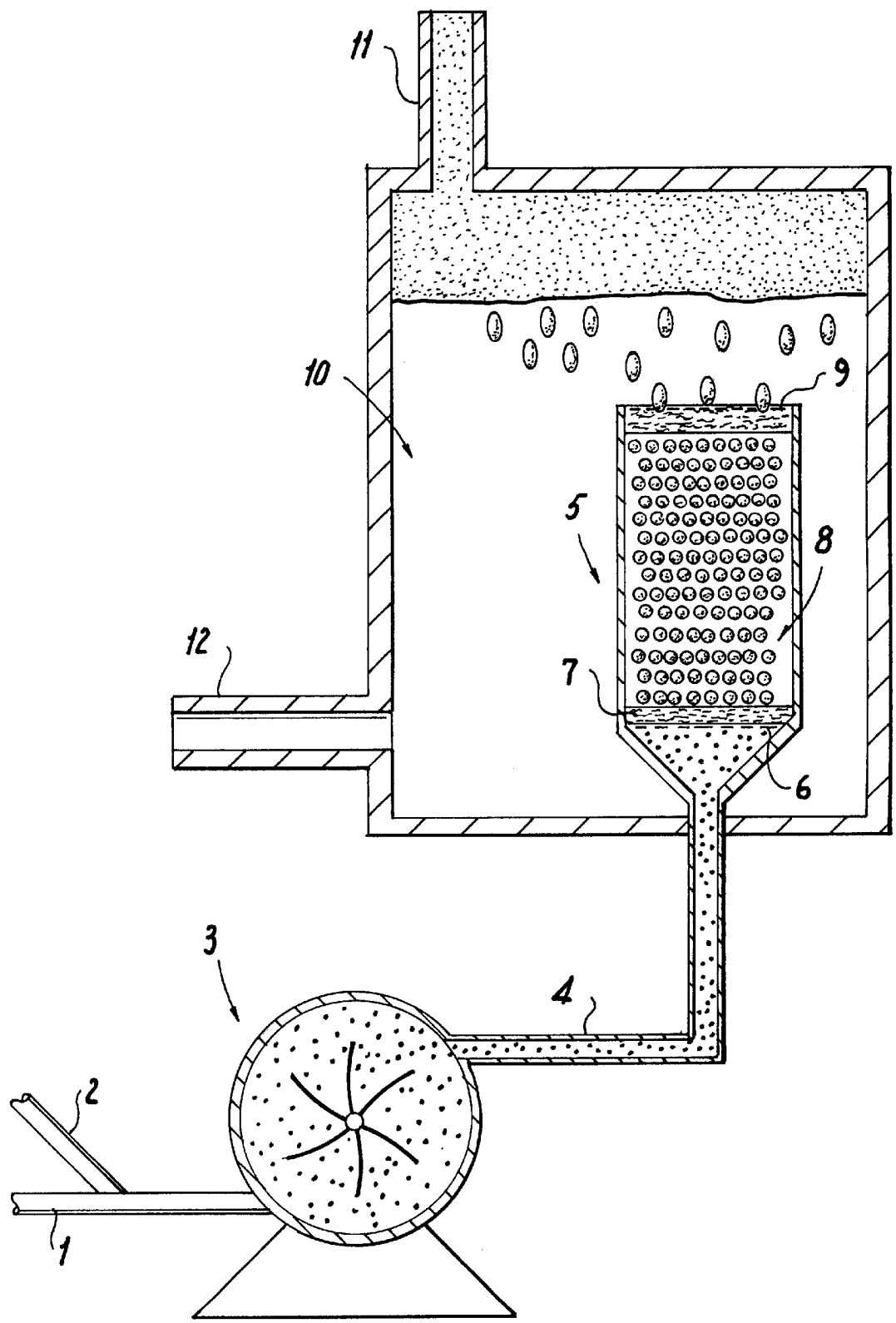
FIG. 1 shows an embodiment with which liquid-liquid extraction according to the invention can be performed.

In FIG. 1 the centrifugal pump used for dispersing the extraction liquid in the liquid is indicated with the reference numeral 3. The outlet of the centrifugal pump is connected, via a tube 4, to the inlet of the vertically mounted cylindrical container 5, which contains the packed bed 8, which is bounded at the top and the bottom by the sieve plates 6 and 9, on the inside of which there may be a filter packing 7 if so desired. The cylindrical container 5 is mounted in the phase separator 10, where the large droplets of extraction liquid formed by coalescence in the packed bed meet before leaving the phase separator via the outlet 11 for a regeneration unit where the extracted component is separated from the extraction liquid, which can then be re-introduced into the extraction process.

Figure 2:
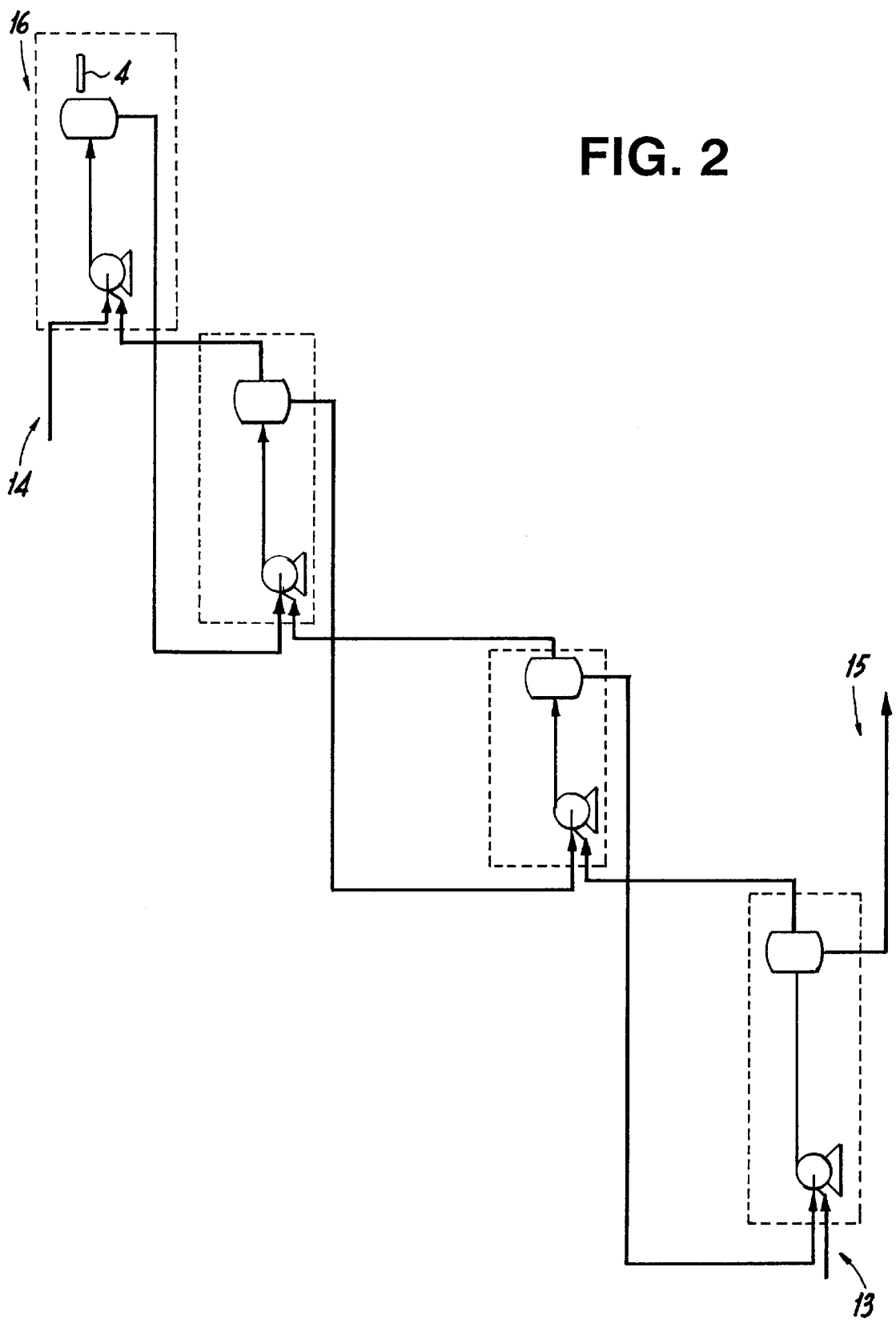
FIG. 2 shows a number of apparatuses according to the invention connected in series, with use being made of the counterflow principle.

FIG. 2 shows an extraction system made up of four units where the units are connected in series according to the counterflow principle. The extraction liquid enters the system via 13 and leaves it again via 16. The liquid enters the system via 14 in order to leave it again in a purified form via 15.

Set-up I

Set-up I was made up of an extraction system composed of three units of similar shape, each composed of a centrifugal pump, a packed column, and a phase separator.

The centrifugal pump was a magnetic pump of the make IWAKE and had a capacity of 4200 l/hour at a maximum rotational speed of 3800 rpm. The supply voltage of the pump was infinitely variable.

The packed column was composed of a 15 cm high cylinder with a diameter of 2.54 cm containing a packed bed of porous polypropylene particles the pores of which were filled with octyloctanoate.

The polypropylene particles were obtained by mixing 38 parts by weight (pbw) of polypropylene (type Hostacom G3 N01, ex Hoechst) filled with 30 wt. % of glass fibres (average diameter 13 $\mu$m) with 62 pbw of a 80/20 mixture of 80 pbw of Emkaraat 7930 ex ICI and 20 pbw of castor oil. The solution was spun through a spinneret plate, and the resulting filaments were laid on a conveyor belt where the material was cooled down and then chopped up into particles of 0.7–1 mm.

The resulting porous polymer had a porosity of 70% and a cellular body-window structure with an average cell diameter of 11±5 $\mu$m (determined with the aid of scanning electron microscopy).

After the transfer of the porous polymer particles to the cylinder, it was closed off on either side with two circular plates with round holes of 0.5 mm in diameter. The outlet of the coalescer was positioned about three quarters of the way up, approximately at the centre of the 30 cm high cylindrical phase separator, which had a diameter of 5 cm.

Set-up II

Set-up II was made up of a single unit of an infinitely variable centrifugal pump of the type RCKU25/160C with a maximum capacity of 3000 l/hr at a rotational speed of 1450 rpm. The packed column was composed of a 15 cm high cylinder with a diameter of 10 cm containing a bed of porous polypropylene particles filled with octyloctanoate (diameter×length=1×1 mm). The column was closed off on either side with two circular sieve plates with round holes of 0.5 mm in diameter. The outlet of the column was positioned approximately at the centre, about three quarters of the way up a 30 cm high cylindrical phase separator with a diameter of 16 cm.

EXAMPLE I

In the example below use is made of Set-up I for the extraction of water with 8,287 ppm of dichloromethane (DCM) dissolved therein.

The extraction liquid used was octyloctanoate, 3 l/hr (litres per hour) of which were admixed with 29.9 l/hr of water. The supply voltage of the centrifugal pump was 60 V (volt) and was such as gave good dispersion of the octyloctanoate in water without any build-up of pressure. The droplet size ranged from 5 to 120 $\mu$m. The linear velocity of the water in the packed column was 60 m/hr while in the phase separator it was 21 m/hr.

The water from the phase separator contained 221 ppm of DCM and 14.2 ppm of octyloctanoate. For that reason the effluent was passed through an additional coalescer-phase separator, in which process the octyloctanoate content in the water was reduced to 1 ppm. The residence time in the additional coalescer-phase separator, referred to in the table below as slot, was 120 seconds.

EXAMPLE II

The experiment of Example I was repeated, except that the water throughput was increased to 40 l/hr. The supplied water contained 9,880 ppm of DCM. The supply voltage of the centrifugal pump was 80 V. The water effluent contained 2,458 ppm of DCM and 84 ppm of octyloctanoate. The linear velocity of the water in the coalescer and in the phase separator was 80 and 28 m/hr, respectively. The residence time in the additional coalescer-phase separator or slot was 120 seconds.

| Example | 1 | 2 | 3 | 4 | 5 | 6 | 7 |
|---|---|---|---|---|---|---|---|
| set-up | I | I | I | I | II | II | II |
| pump setting | 60V* | 80V | 60V | 60V | 480 rpm | 480 rpm | 480 rpm |
| residence time in dispersion apparatus, s | <10 | <10 | <10 | <10 | <10 | <10 | <10 |
| compound to be extracted | DCM** | DCM | DCM | benzene | DCM | DCM | DCM |
| water velocity in coalescer, m/hr | 60 | 80 | 80 | 80 | 80 | 120 | 140 |
| water velocity in phase | 21 | 28 | 28 | 28 | 19 | 28 | 33 |

-continued

| Example | 1 | 2 | 3 | 4 | 5 | 6 | 7 |
|---|---|---|---|---|---|---|---|
| separator, m/hr | | | | | | | |
| residence time in phase separator, s | 60 | 45 | 45 | 45 | 60 | 36 | 30 |
| extraction factor | 3.0 | 1.8 | 1.8 | 3.0 | 2.5 | 2.5 | 2.5 |
| output per extraction stage | 0.95 | 0.95 | 0.95 | 0.95 | 1 | 1 | 1 |
| oil content in effluent, ppm | 14.2 | 84 | 48 | 2.4 | 7 | 10.4 | 180 |
| presence of slot | Y | N | Y | Y | N | N | N |

V* stands for volt
**DCM stands for dichloromethane

What is claimed is:

1. A process for extracting a component dissolved in a first liquid to be extracted by means of liquid-liquid extraction using an extraction liquid which is immiscible or only partially miscible with the liquid to be extracted in which process the extraction liquid is dispersed in the liquid in a dispersion apparatus and then coalesced in a coalescer, after which the extraction liquid, the specific weight of which differs by at least 5% from the specific weight of the liquid to be extracted in which the component to be extracted is to be found, is separated from the first liquid by gravity in a phase separator, characterised in that in order to obtain an efficiency per extraction stage of at least 0.9 at an average residence time of at most 15 seconds in the dispersion apparatus and of at most 300 seconds in the phase separator, at a linear velocity in the coalescer related to its cross-section of at least 30 m/hour:
   a. the dispersion apparatus used is a centrifugal pump which will give droplets having an average diameter of 5 to 500 µm,
   b. the coalescer used is a packed bed of 5–100 cm high comprised of dimensionally stable particles wettable by the extraction liquid having an average particle size of 0.05 to 2 mm, and
   c. the coagulated phase in the phase separator is separated at a linear velocity related to the cross-section of the phase separator of 0.1 to 0.7 times the linear velocity related to the cross section of the coalescer.

2. A process according to claim 1, characterised in that the linear velocity in the coalescer is at least 60 m/hour.

3. A process according to claim 2, characterised in that the residence time in the phase separator is at most 150 seconds.

4. A process according to claim 3, characterised in that the residence time in the phase separator is at most 60 seconds.

5. A process according to claim 1, characterised in that the residence time in the phase separator is at most 150 seconds.

6. A process according to claim 5, characterised in that the residence time in the phase separator is at most 60 seconds.

7. A process according to one of claims 1–4, characterised in that the height of the packed bed is selected to be between 8 and 50 cm.

8. A process according to one of claims 1–4, characterised in that the dimensionally stable particles are spheres of polypropylene.

9. A process according to one of claims 1–4, characterised in that in order to obtain an extraction liquid content of at most 1 ppm the liquid after separation by gravity is passed through a second packed bed of 5–100 cm high which is filled with particles more or less comparable in composition and size to those used in the first bed, after which the extraction liquid is separated by gravity in a second phase separator.

10. An apparatus for liquid-liquid extraction using a process according to one of claims 1–4, characterised in that the apparatus comprises the following members:
    a. a modified or unmodified centrifugal pump for dispersing the extraction liquid and the liquid which is immiscible or only partially miscible with it in which the component to be extracted is to be found, which pump is equipped with an inlet and an outlet, in which pump the extraction liquid and the other liquid are subjected to forces of shear, and the outlet of which pump is connected to an inlet of.
    b. a coalescer comprising a packed bed of 5–100 cm high of dimensionally stable, extraction liquid-wettable particles having an average particle size of 0.05 to 2 mm, of which the outlet opens into
    c. a phase separator where the extraction liquid and the other liquid are separated by gravity and which is also equipped with an outlet for the extraction liquid and an outlet for the other liquid wherein the coalescer and phase separator are constructed and arranged to effect a linear velocity relative to cross section of the liquids through the phase separator of 0.1 to 0.7 times a linear velocity relative to cross section of the liquids through the coalescer.

11. An apparatus according to claim 10, characterised in that the packed bed is 8–50 cm high.

12. A apparatus according to claim 11, characterised in that the outlet of the phase separator for the other liquid is connected to the inlet of a second coalescer provided with a packed bed of 5–100 cm high filled with particles which are more or less comparable in composition and size to those used in the first coalescer, with the outlet of the second coalescer being connected to a second phase separator where the extraction liquid and the other liquid are separated by gravity, with the second phase separator having an outlet for the extraction liquid as well as an outlet for the other liquid.

13. An apparatus for liquid-liquid extraction in which at least two apparatuses according to claim 11 are connected to one another in counterflow relation, with the other liquid outlet of the phase separator of apparatus N being connected to the liquid inlet of the centrifugal pump of apparatus N+1 and the extraction liquid inlet of the centrifugal pump of apparatus N being connected to the extraction liquid outlet of the phase separator of apparatus N−1.

14. An apparatus according to claimed 13, characterised in that the phase separator outlet for the other liquid from the final apparatus is connected to the inlet of a final coalescer provided with a packed bed of 5–100 cm high filled with particles which are more or less comparable in composition and size to those used in the other coalescers, with the outlet of said final coalescer being connected to a final phase separator in which the extraction liquid and the other liquid are separated by gravity and where the final phase separator has an outlet for the extraction liquid as well as an outlet for the other liquid.

15. An apparatus according to claim 10, characterised in that the centrifugal pump is provided with two separate inlets for the other liquid and the extraction liquid, respectively, and said inlets are positioned vis-à-vis one another such that the other liquid and the extraction liquid are brought into contact in the centrifugal pump in an area where forces of shear prevail.

16. An apparatus according to claim 15, characterised in that the outlet of the phase separator for the other liquid is connected to the inlet of a second coalescer provided with a packed bed of 5–100 cm high filled with particles which are more or less comparable in composition and size to those used in the first coalescer, with the outlet of the second coalescer being connected to a second phase separator where the extraction liquid and the other liquid are separated by gravity, with the second phase separator having an outlet for the extraction liquid as well as an outlet for the other liquid.

17. An apparatus for liquid-liquid extraction in which at least two apparatuses according to claim 15 are connected to one another in counterflow relation, with the other liquid outlet of the phase separator of apparatus N being connected to the liquid inlet of the centrifugal pump of apparatus N+1 and the extraction liquid inlet of the centrifugal pump of apparatus N being connected to the extraction liquid outlet of the phase separator of apparatus N−1.

18. An apparatus according to claim 17, characterised in that the phase separator outlet for the other liquid from the final apparatus is connected to the inlet of a final coalescer provided with a packed bed of 5–100 cm high filled with particles which are more or less comparable in composition and size to those used in the other coalescers, with the outlet of said final coalescer being connected to a final phase separator in which the extraction liquid and the other liquid are separated by gravity and where the final phase separator has an outlet for the extraction liquid as well as an outlet for the other liquid.

19. An apparatus according to claim 10, characterised in that the outlet of the phase separator for the other liquid is connected to the inlet of a second coalescer provided with a packed bed of 5–100 cm high filled with particles which are more or less comparable in composition and size to those used in the first coalescer, with the outlet of the second coalescer being connected to a second phase separator where the extraction liquid and the other liquid are separated by gravity, with the second phase separator having an outlet for the extraction liquid as well as an outlet for the other liquid.

20. An apparatus for liquid-liquid extraction in which at least two apparatuses according to claim 10, are connected to one another in counterflow relation, with the other liquid outlet of the phase separator of apparatus N being connected to the liquid inlet of the centrifugal pump of apparatus N+1 and the extraction liquid inlet of the centrifugal pump of apparatus N being connected to the extraction liquid outlet of the phase separator of apparatus N−1.

21. An apparatus according to claim 20, characterised in that the phase separator outlet for the other liquid from the final apparatus is connected to the inlet of a final coalescer provided with a packed bed of 5–100 cm high filled with particles which are more or less comparable in composition and size to those used in the other coalescers, with the outlet of said final coalescer being connected to a final phase separator in which the extraction liquid and the other liquid are separated by gravity and where the final phase separator has an outlet for the extraction liquid as well as an outlet for the other liquid.

* * * * *